United States Patent
Cho et al.

(10) Patent No.: US 8,590,414 B2
(45) Date of Patent: Nov. 26, 2013

(54) SHIFT LEVER FOR AUTOMATIC TRANSMISSION

(75) Inventors: Ean Soo Cho, Hwaseong-si (KR); Joon Young Park, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 220 days.

(21) Appl. No.: 13/189,056

(22) Filed: Jul. 22, 2011

(65) Prior Publication Data

US 2012/0137813 A1 Jun. 7, 2012

(30) Foreign Application Priority Data

Dec. 2, 2010 (KR) .................. 10-2010-0122241

(51) Int. Cl.
| | |
|---|---|
| B60K 20/00 | (2006.01) |
| G05G 5/08 | (2006.01) |
| G05G 5/00 | (2006.01) |
| F16H 59/04 | (2006.01) |

(52) U.S. Cl.
USPC ............... 74/473.29; 74/473.3; 74/473.24

(58) Field of Classification Search
USPC ........... 74/473.1, 473.24, 473.25, 473.29, 74/473.3
See application file for complete search history.

(56) References Cited

U.S. PATENT DOCUMENTS

| | | | | |
|---|---|---|---|---|
| 3,800,909 | A * | 4/1974 | Duncanson et al. | 181/207 |
| 6,789,444 | B2 * | 9/2004 | Fujiwara et al. | 74/473.23 |
| 6,931,963 | B2 * | 8/2005 | Jarjoura et al. | 74/543 |
| 7,654,169 | B2 * | 2/2010 | Sumi et al. | 74/473.3 |
| 2004/0182191 | A1 * | 9/2004 | Kondo et al. | 74/473.3 |
| 2006/0230858 | A1 * | 10/2006 | Kurogane | 74/473.1 |

FOREIGN PATENT DOCUMENTS

| | | |
|---|---|---|
| JP | 62-129618 U | 8/1987 |
| JP | 09-220942 A | 8/1997 |

* cited by examiner

*Primary Examiner* — Justin Krause
(74) *Attorney, Agent, or Firm* — Morgan, Lewis & Bockius LLP

(57) ABSTRACT

A shift lever for an automatic transmission improves a shift manipulating feeling and simultaneously reduce a rattling noise by preventing noise generated due to contact with a rod after manipulating a push button. The shift lever for the automatic transmission may include a rod movably provided inside the shift lever in its longitudinal direction, a push button vertically provided to the rod, an operating portion provided between the push button and the rod, and having a supporting portion at which an installation hole is formed and a slant portion, and a damping unit coupled to the installation hole, and provided between the rod portion and the supporting portion to absorb and reduce vibration of a power train transferred through the rod and vibration due to a road surface.

4 Claims, 3 Drawing Sheets

SHIFT LEVER FOR AUTOMATIC TRANSMISSION

CROSS-REFERENCE TO RELATED APPLICATION

The present application claims priority of Korean Patent Application Number 10-2010-0122241 filed Dec. 2, 2010, the entire contents of which application is incorporated herein for all purposes by this reference.

BACKGROUND OF INVENTION

1. Field of Invention

The present invention relates to a shift lever for an automatic transmission. More particularly, the present invention relates to a shift lever for an automatic transmission to improve a shift manipulating feeling, and simultaneously reduce a rattling noise by preventing noise generated due to contact with a rod after manipulating a push button.

2. Description of Related Art

In general, a vehicle having an automatic transmission is provided with a shift lever for selecting each shift range, that is, P, R, N, D, 3, 2, or L range.

This shift lever has a push button for limiting movement from a specified shift range to another specified shift range in order to prevent the wrong shift manipulation of a driver. In other words, the shift operations, such as P<->R, N->R, D->3, 3->2, and 2->L are limited.

When the driver presses the push button, a slant portion formed inside the push button descends through contact with the rod and presses the rod downwardly.

Then, the rod moves downward and enables the shift lever to move at each shift range.

However, in the shift lever for the automatic transmission as the above, the rod which is ascended by the returning force of a select spring is in contact with the push button after manipulating the push button, thereby generating noise.

Also, vibration of a power train and vibration by a road surface are transferred to the shift lever during traveling of the vehicle, thereby generating a rattling noise.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a shift lever for an automatic transmission having advantages of improving a shift manipulating feeling and simultaneously reducing a rattling noise by preventing noise generated due to contact with a rod after manipulating a push button.

One aspect of the present invention is directed to a shift lever for an automatic transmission including a rod movably provided inside the shift lever in its longitudinal direction, a push button vertically provided to the rod, an operating portion provided between the push button and the rod, and having a supporting portion at which an installation hole is formed and a slant portion, and a damping unit coupled to the installation hole, and provided between the rod portion and the supporting portion to absorb and reduce vibration of a power train transferred through the rod and vibration due to a road surface.

The damping unit may include an insertion portion which is inserted in the installation hole and is formed in a circular bar shape, and a damping portion contacting the rod.

The diameter of the damping portion may be larger than the diameter of the installation hole.

The damping unit may be made of a rubber material.

The damping unit may be formed in a circular dumbbell shape.

According to various embodiments of the present invention, it is possible to improve the shift manipulating feeling by preventing the noise generated due to contact with the rod after manipulating the push button by installing the damping unit inside the push button.

Further, when the vibration of the power train and the vibration due to the road surface are transferred to the rod through the shift lever during traveling of the vehicle, the damping unit reduces the rattling noise by absorbing the vibration.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
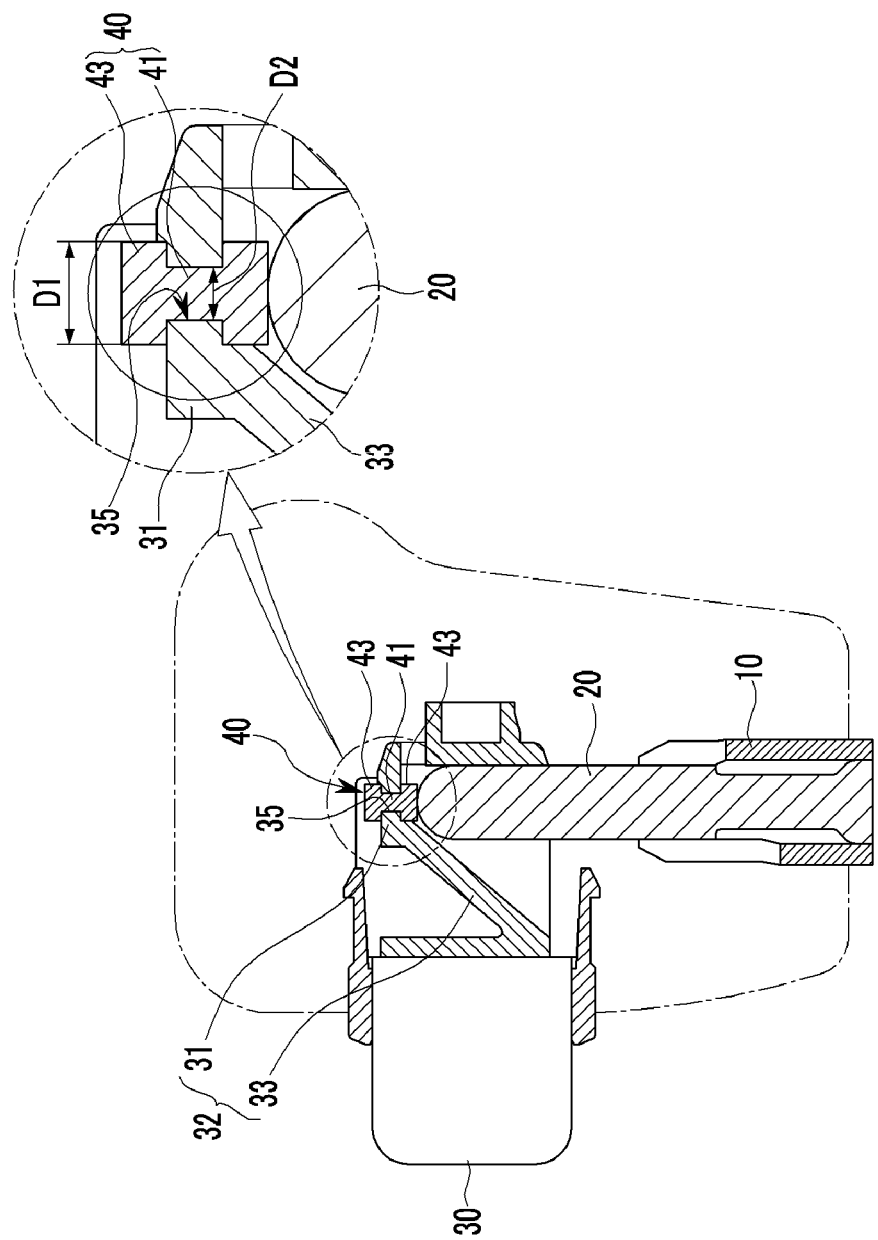
FIG. 1 is a schematic diagram illustrating a shift lever for an exemplary automatic transmission according to the present invention.

FIG. 1 is a schematic diagram illustrating a shift lever for an automatic transmission according to various embodiments of the present invention.

Figure 2:
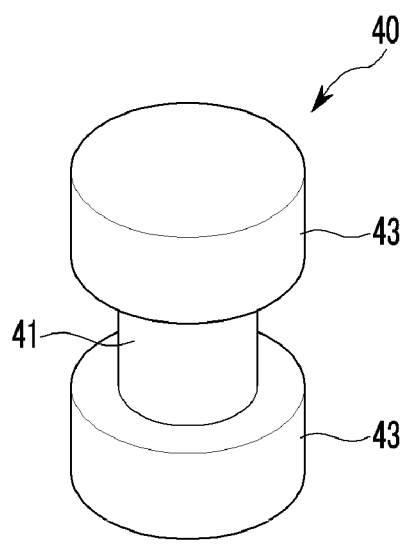
FIG. 2 is a perspective view illustrating an exemplary damping unit applied to a shift lever for an automatic transmission according to the present invention.

FIG. 2 is a perspective view illustrating a damping unit applied to a shift lever for an automatic transmission according to various embodiments of the present invention.

Referring to the drawings, a shift lever 10 for an automatic transmission according to various embodiments of the present invention improves a shift manipulating feeling and simultaneously reduces a rattling noise by preventing noise generated due to contact with a rod 20 after manipulating a push button 30.

To this end, as shown in FIG. 1, the shift lever 10 for the automatic transmission according to various embodiments of the present invention includes a rod 20 movably provided inside the shift lever 10 in its longitudinal direction, a push button 30 vertically provided to the rod 20, an operating portion 32 provided between the push button 30 and the rod 20 and having a supporting portion 31 at which an installation hole 35 may be formed and a slant portion 33, and a damping unit 40 coupled to the installation hole 35, and provided between the rod portion 20 and the supporting portion 31 to absorb and reduce vibration of a power train transferred through the rod 20 and vibration due to a road surface.

When manipulation of a shift range is required, the push button 30 directly gets the manipulation force of the driver by being disposed in the vertical direction to the rod 20, so as to exert the force applied in a direction perpendicular to the ascending and descending directions of the rod 20 to the slant portion 33.

Here, the shift lever 10 for the automatic transmission according to various embodiments of the present invention further includes the damping unit 40 for preventing the rod 20 from directly contacting the supporting portion 31 when returning the rod 20 descended by the operation of the push button 30, and absorbing the vibration of the power train transferred through the rod 20 and the vibration due to the road surface during traveling of the vehicle.

The damping unit 40 may be installed through the installation hole 35 which may be formed at the supporting portion 31 corresponding to the rod 20.

Here, as shown in FIG. 2, the damping unit 40 includes an insertion portion 41 and a damping portion 43.

First, the insertion portion 41 inserted in the installation hole 35 may be formed in a circular bar shape and may have the same length as the thickness of the supporting portion 31 and the same diameter as the inner diameter of the installation hole 35.

In other words, the insertion portion 41 may be formed in the same diameter as the inner diameter of the installation hole 35 to be pressed and installed in the installation hole 35.

In various embodiments, the damping portion 43 may be integrally formed at each of both ends of the insertion portion 41 to be supported on the inner and outer sides of the supporting portion 31, respectively. One will appreciate that the damping portion 43 may be monolithically formed at the ends of the insertion portion.

The diameter D1 of the damping portion 43 may be larger than the inner diameter D2 of the installation hole 35.

Further, the damping unit 40 may be made of a rubber material in order to absorb vibration and noise.

Further, an overall shape of the damping unit 40 configured as the above is a circular dumbbell shape.

That is, the damping unit 40 may be installed in the installation hole 35 through the insertion portion 41, so that the damping portion 43 keeps to be supported on inner and outer sides of the supporting portion 31 in the upper and lower portions of the installation hole 35.

Accordingly, when the vibration is generated in the state that a front end of the rod 20 is in contact with the damping portion 43 in the inner side of the supporting portion 31, each damping portion 43 of the damping unit 40 which may be formed in the dumbbell shape generates the pressing effect by the bending phenomenon which is moved in the frontward and rearward or the leftward and rightward with the insertion portion 41 as its center, thereby effectively absorbing the vibration.

Hereinafter, the operation and the action of the shift lever for the automatic transmission according to various embodiments of the present invention constituted as the above will be described in detail.

Figure 3:
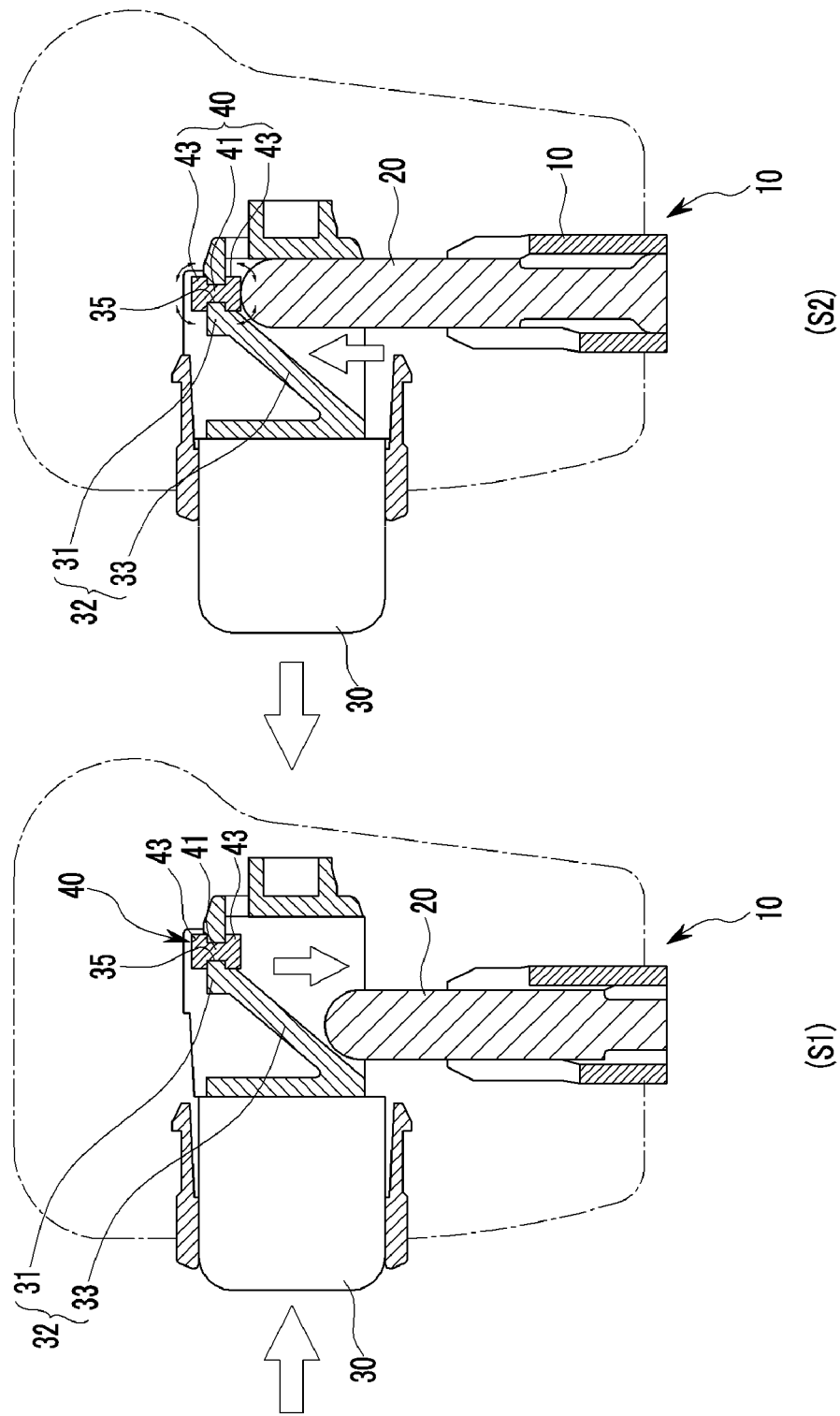
FIG. 3 is a view illustrating an operating state to an on/off state of a push button in a shift lever for an exemplary automatic transmission according to the present invention.

FIG. 3 is a view illustrating an operating state to an on/off state of a push button in a shift lever for an automatic transmission according to various embodiments of the present invention.

First, when the driver presses the push button 30 to manipulate the shift range, as shown in S1 of FIG. 3, the rod 20 moves downward along the slant portion 33 in the state that the rod 20 is in contact with the damping portion 43 of the damping unit 40.

In this state, when movement of the shift lever is finished, the driver releases the press of the push button 30.

Then, the push button 30 is returned to the initial position, which is the state before the driver presses the push button 30 by a returning spring (not shown).

Here, as shown in S2 of FIG. 3, the rod 20 is returned to the original position again by the returning force of the select spring (not shown), and then the front end of the rod 20 is in contact with the damping portion 43 of the damping unit 40.

Thus, it is possible to prevent the noise generated while the front end of the rod 20 is directly in contact with the supporting portion 31 when the damping unit 40 is not applied in the related art.

When the shift manipulation is not required during traveling of the vehicle, the vibration generated from the power train and the vibration generated in traveling are transferred through the rod 20 to the damping unit 40 which is directly in contact with the rod 20.

Then, the damping portion 43 generates the pressing effect by the bending phenomenon which is moved in the frontward and rearward or the leftward and rightward in the inner and outer sides of the supporting portion 31 with the insertion portion 41 as its center, so as to prevent the rod 20 from deviating from the damping unit 40.

At the same time, the damping unit 40 prevents occurrence of the rattling noise by absorbing the vibration transferred through the rod 20.

Therefore, if the shift lever for the automatic transmission according to various embodiments of the present invention configured as the above is applied, it is possible to improve the shift manipulating feeling by preventing the noise generated due to contact with the rod 20 after manipulating the push button 30 by installing the damping unit 40 inside the push button 30.

Further, when the vibration of the power train and the vibration due to the road surface are transferred to the rod 20 through the shift lever 10 during traveling of the vehicle, the damping unit 40 may reduce the rattling noise by absorbing the vibration.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift lever for the automatic transmission, comprising:
a shift lever;
a rod movably provided inside the shift lever along its longitudinal direction;
a push button vertically provided to the rod;
an operating portion provided between the push button and the rod, and having a supporting portion at which an installation hole is formed and a slant portion; and
a damping unit coupled to the installation hole, and provided between the rod portion and the supporting portion to absorb and reduce vibration of a power train transferred through the rod and vibration due to a road surface;
wherein the damping unit includes an insertion portion which is inserted in the installation hole and is formed in a circular bar shape, and a damping portion contacting the rod.

2. The shift lever for the automatic transmission of claim 1, wherein:
the diameter of the damping portion is larger than the diameter of the installation hole.

3. The shift lever for the automatic transmission of claim 1, wherein:
the damping unit is made of a rubber material.

4. The shift lever for the automatic transmission of claim 1, wherein:
the damping unit is formed in a circular dumbbell shape.

* * * * *